(12) United States Patent
Pask et al.

(10) Patent No.: US 8,567,113 B2
(45) Date of Patent: Oct. 29, 2013

(54) PEST CONTROL FOR BURROWING ANIMALS

(75) Inventors: Murray Pask, Atwater (CA); James W. Halford, Indian Head (CA)

(73) Assignee: Murray Pask, Atwater, Saskatchewan, Soaoco ( * ) Notice: Subject to any disclaimer, the term of this patent is extended or adjusted under 35 U.S.C. 154(b) by 363 days.

(21) Appl. No.: 13/078,230

(22) Filed: Apr. 1, 2011

(65) Prior Publication Data
US 2011/0239527 A1    Oct. 6, 2011

Related U.S. Application Data

(60) Provisional application No. 61/320,030, filed on Apr. 1, 2010.

(51) Int. Cl.
*A01M 13/00*    (2006.01)
(52) U.S. Cl.
USPC ................................. 43/125; 43/127
(58) Field of Classification Search
USPC .................... 43/125, 127, 129, 130
See application file for complete search history.

(56) References Cited

U.S. PATENT DOCUMENTS

| | | | | |
|---|---|---|---|---|
| 261,558 A * | 7/1882 | Lambert | | 111/124 |
| 1,403,461 A * | 1/1922 | Van Meter | | 43/125 |
| 1,872,676 A * | 8/1932 | Castonguay | | 43/127 |
| 2,201,995 A * | 5/1940 | Erickson | | 43/125 |
| 2,467,922 A * | 4/1949 | Woytal et al. | | 285/8 |
| 4,829,706 A * | 5/1989 | Perry | | 43/125 |
| 5,700,039 A * | 12/1997 | Manning | | 285/148.23 |
| 2009/0313882 A1* | 12/2009 | Hurlburt | | 43/125 |
| 2011/0197495 A1* | 8/2011 | Shaw | | 43/125 |
| 2011/0277373 A1* | 11/2011 | Robbins | | 43/125 |

* cited by examiner

*Primary Examiner* — Christopher P Ellis
(74) *Attorney, Agent, or Firm* — Kyle R. Satterthwaite; Ryan W. Dupuis; Ade & Company, Inc.

(57) ABSTRACT

A method of pest control for burrowing animals involves loading a machine-conveyed dispensing apparatus with a fumigant product, and using the machine to make one or more passes across an area of ground beneath which the burrow system is situated. A ground engagement tool of the dispensing apparatus is engaged in the ground to pass through or nearby sections of the burrow system, and fumigant product is dispensed into the ground behind a leading portion of the ground engagement tool. Fumigant is widely spread over the burrowed area of ground for effective results, while the human exposure and manual effort associated with conventional hand-placed fumigant techniques is greatly reduced.

20 Claims, 4 Drawing Sheets

PEST CONTROL FOR BURROWING ANIMALS

CROSS REFERENCE TO RELATED APPLICATIONS

This application claims benefit under 35 U.S.C. 119(e) of U.S. Provisional Patent Application Ser. No. 61/320,030, filed Apr. 1, 2010.

FIELD OF THE INVENTION

The present invention relates to a pest control method for burrowing rodents.

BACKGROUND OF THE INVENTION

A common problem in agriculture is the loss of crops due to pests, including burrowing rodents such as, but not limited to, the pocket gopher. Pocket gophers differ from many other burrowing animals in that they maintain closed burrow systems in which the animal closes off sections of the subterranean burrow system from other sections and from the surface by backfilling old tunnels and plugging openings at the surface with earth.

Prior art methods of burrowing animal extermination include trapping, explosion using propane and oxygen injection, poison baiting using grains or pellets treated with zinc phosphide or other rodenticide, and burrow fumigating. Known burrow fumigating techniques are injection of gasoline engine exhaust, anhydrous ammonia or other gaseous substance into a burrow, or placement of solid fumigant tablets or pellets into a located burrow either manually or a dispenser carried by an individual tasked with the extermination. Known solid fumigants include tablets or pellets of aluminum phosphide or magnesium phosphide which react with water or moisture and temperature in the soil or atmosphere of the burrow to slowly release toxic phosphine gas to kill rodents subject to its exposure within the confines of the burrow. Known baiting techniques include similar manual placement of bait at located burrows, or distribution over an affected field using a burrow builder which is driven across the field in multiple passes to create a series of simulated rodent burrows or tunnels that intersect with the animals' original burrow. Using a metering device, the burrow builder dispenses toxic bait into the artificially created tunnels at spaced locations with the hopes that the animals will explore these new tunnels and come across and consume the toxic bait.

The foregoing prior art techniques leave room for improvement when dealing with the burrow systems of rodents.

All techniques that require manual location of the burrow are very labor intensive. This includes trapping and the burrow locating procedures required for known solid fumigant placement and manual bait placement techniques.

Fumigation using devices where the supply of fumigant stops when the fumigation device is removed, such as anhydrous ammonia or gasoline engine exhaust, is not believed to be very effective. The gas is not believed to spread or disperse widely through the burrow system, and accordingly rodents not in the vicinity of the manually located burrow sections may not be exposed to the fumigant. Numerous publications on the subject categorize burrow fumigation as generally ineffective for pocket gophers when conventional fumigant application methods are employed.

Fumigation using individual solid fumigant tablets allows for a continuous supply of fumigant until the tablet is depleted. This increases the likelihood of the rodent encountering the fumigant. However, thorough determination of the burrow system is required to enable full coverage with manual placement of the tablets to ensure adequate exposure of the animals to the gas.

Baiting can also be problematic, in that the burrowing animals may not consume the bait if more desirable sources of food, such as plant roots, are available. Accordingly, in an alfalfa field, root-crop field, orchard or other area where plant roots are readily available to the animals, the roots may be more appetizing to the animals than the bait. As the rodenticide in the bait is only effective if consumed, the animals' ignorance of the bait in view of the more appealing plant roots renders the baiting process ineffective.

There can also be risk to humans who are applying toxic fumigants in a manual fashion, for example due to the potential for accidental exposure to the toxic fumes.

In view of the forgoing, there is a desire for an improved method of pest control effective against burrowing rodents.

SUMMARY OF THE INVENTION

According to one aspect of the invention there is provided a method of pest control for burrowing rodents that maintain a burrow system, the method comprising:

providing a dispensing apparatus conveyable in a forward working direction and comprising a frame, a ground engagement tool carried on the frame and extending downward therefrom, a container carried with the frame, a metering device associated with an outlet of the container, and a product delivery passage communicable with the container through the metering device and extending downward behind a leading portion of the ground engagement tool to a dispensing outlet behind the ground engagement tool;

loading the container of the dispensing apparatus with a fumigant product;

using the vehicle to make one or more passes across an area of ground beneath which the burrow system is situated with the ground engagement tool of the dispensing apparatus engaged in the ground to pass through or by sections of the burrow system; and during the one or more passes, dispensing fumigant product into the ground behind the leading portion of the ground engagement tool; and leaving the fumigant product in the ground to gradually release fumigant gas over time.

Preferably the fumigant product is a solid fumigant product, units of which are dispensed one at a time at spaced apart intervals to place individual units at spaced apart positions in the ground.

The units of solid fumigant product may be solid fumigant pellets or tablets.

Preferably the solid fumigant product is a phosphine releasing product.

Preferably the solid fumigant product comprises aluminum phosphide or magnesium phosphide.

Preferably the solid fumigant product is moisture activated. In this instance, the method may include dispensing liquid into the ground to activate the units of solid fumigant, in which case the liquid is preferably dispensed from a liquid source that is connected to the dispensing apparatus, and preferably carried on the frame thereof.

In an alternative embodiment, the fumigant product may be a liquid or liquefied product that is in a flowable state and placed in the soil to slowly release toxic gas.

The burrow system may be a closed burrow system.

The burrowing animals may be pocket gophers. Alternatively, the invention may be employed for control of other burrowing rodents regardless whether they maintain a closed-burrow system, and for example may be employed for rodents such as, but not limited to, the Richardson ground squirrel.

A food source for the burrowing animals may be present in the ground.

The ground may contain plant roots, and more specifically may contain alfalfa roots.

The dispensing apparatus may comprise a burrow builder, with the ground engagement tool comprising a burrow forming element engaged in the ground to form sections of underground tunnel.

Preferably the sections of the formed underground tunnel intersect with the sections of the burrow system.

According to a second aspect of the invention there is provided a method of pest control for burrowing rodents that maintain a burrow system, the method comprising:

providing a dispensing apparatus conveyable in a forward working direction and comprising a frame, a burrow forming element carried on the frame and extending downward therefrom, a container carried with the frame, a metering device associated with an outlet of the container, and a product delivery passage communicable with the container through the metering device and extending downward behind a leading portion of the ground engagement tool to a dispensing outlet behind the burrow forming element;

loading the container of the dispensing apparatus with a fumigant product;

making one or more passes across an area of ground beneath which the burrow system is situated with the burrow forming element tool of the dispensing apparatus engaged in the ground to form sections of underground tunnel that pass through or by sections of the burrow system; and during the one or more passes, dispensing fumigant product into the underground tunnel behind burrow forming element.

BRIEF DESCRIPTION OF THE DRAWINGS

In the accompanying drawings, which illustrate a exemplary embodiments of the present invention.

DETAILED DESCRIPTION

A pest control process demonstrating one method of application of the present invention involves using a machine to make a slit in the ground and deposit aluminum phosphide tablets/pellets in the earth for the purpose of controlling rodents. Aluminum phosphide, and the resulting phosphine gas, is a commonly used fumigant in North America. It is registered in some jurisdictions for the control of various rodents, including the pocket gopher. Currently, placement of the aluminum phosphide tablets/pellets is done by locating the rodent's tunnel manually, and placing the aluminum phosphide into the tunnel by hand. The new process uses a machine to make an artificial slit or tunnel in the earth at the approximate depth of the rodent's burrow system. The aluminum phosphide product is metered into this slit, and the earth is sealed above the slit. The rodent's burrow system is intersected randomly by the machine made tunnel/slit. The aluminum phosphide releases phosphine gas over a period of time. In the course of traversing the burrow system, the rodent encounters the phosphine gas and is fumigated.

A typical machine useful for this process would be similar to burrow builders used to place gopher bait in artificially made tunnels. One difference is in the product being dispensed, namely a fumigant product such as aluminum phosphide tablets or pellets, rather than a poison bait. The current method of applying toxic fumigant tablets by hand is both labour intensive and potentially dangerous to the person handling the product. Using a machine to deposit the toxic fumigant product, greatly decreases the cost of rodent control, and minimizes human contact with the product and exposure to the highly toxic phosphine or other gas.

The aforementioned typical machine required for this process would feature a hopper to hold the toxic fumigant product, for example tablets/pellets, a metering device to dispense the toxic fumigant product at appropriate intervals, a narrow shear and tunnel maker to intercept the rodent's burrow system and make a slit/tunnel at this approximate depth in the earth, an optional coulter-disc to assist in minimizing soil disturbance made by the shear, a hose or pipe to transport the toxic fumigant product from the metering system into the artificially made tunnel/slit in the earth, and one or more wheels and/or a drag to seal the slit so that the toxic gas is primarily confined to the earth. Where a phosphine releasing product is used, the confining of the gas beneath the ground is further aided by the heavier-than-air density of the phosphine, which acts to move the gas downward into the burrow system instead of upward to the surface.

Figure 1:
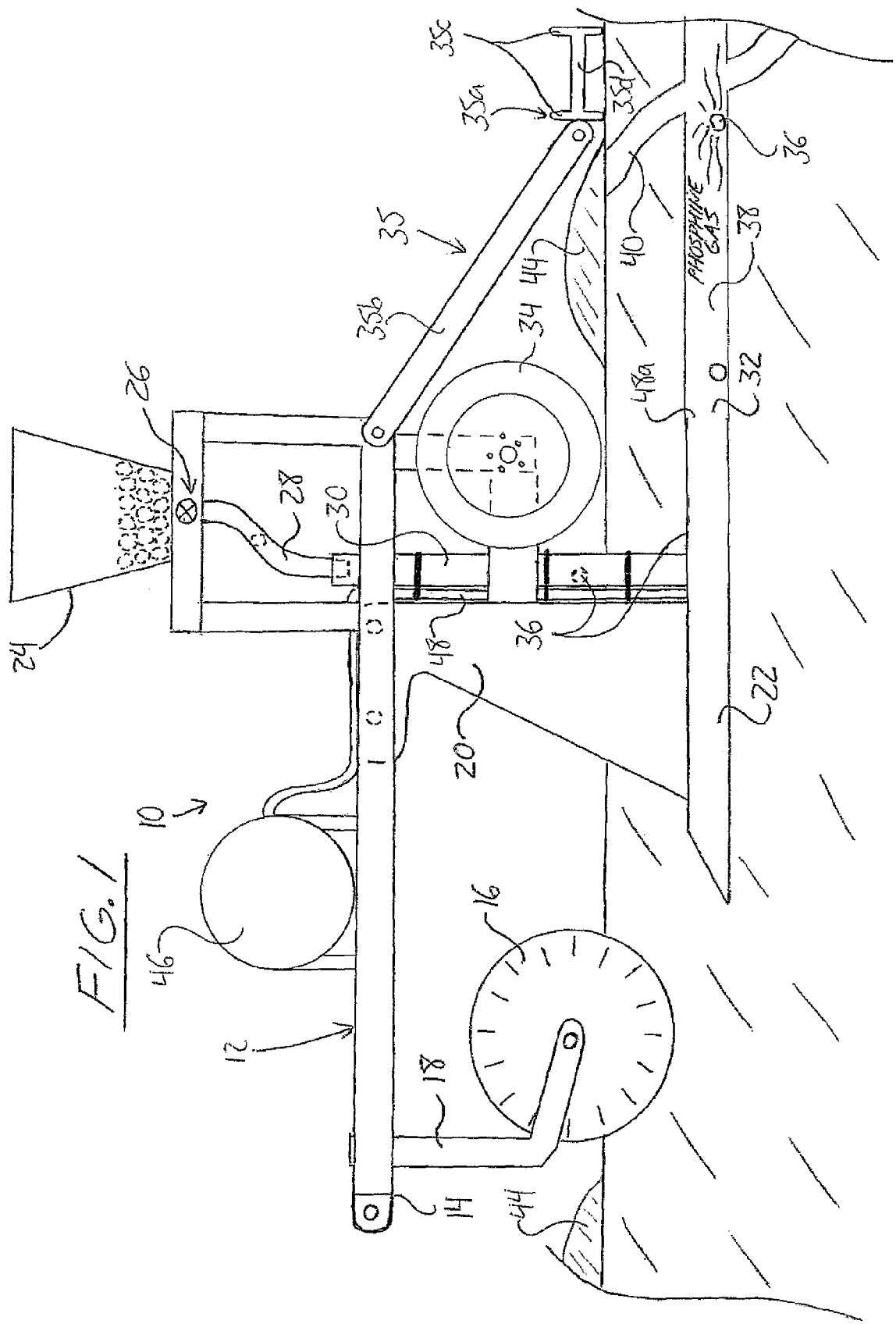
FIG. 1 is a schematic side elevational view illustrating use of a modified burrow building machine to dispense aluminum phosphide tablets into a simulated burrow tunnel formed by the machine beneath the surface.

FIG. 1 shows a burrow building machine 10 being used in accordance with a method of the present invention to dispense the toxic fumigant product into an alfalfa or other crop field, or bare land, being affected by the rodents. As mentioned above, the mechanical structure of the burrow builder 10 is similar to those previously used to dispense poisoned bait for extermination of burrowing rodents. A frame structure 12 of the machine 10 has a front or leading end 14 equipped with suitable connection equipment for coupling with a tow hitch of a suitable tow vehicle such as a tractor or all-terrain vehicle. Different connection equipment types may be used to suit the hitch type of the towing vehicle, which may for example be a 3-point or tow-behind hitch. In the alternative, the burrow builder could be a self-propelled machine. A coulter disc 16 may be rotatably carried on a support arm 18 extending downward from the frame near the front end 14 thereof. Rearward from the disc arm 18, a knife or shank 20 likewise extends downward from the frame 12 and carries a torpedo tube 22 fixed thereto at the bottom end thereof.

The torpedo tube 22 is closed at a sloped front end thereof and has its length generally aligned with a central longitudinal axis of the machine frame 12 corresponding to the direction in which the machine is to be towed or propelled. The diameter of the torpedo tube 22 is greater than the width of the shank 20. A hopper 24 is carried atop the frame 12 and features a metering device 26 installed at its outlet to control the rate at which the hopper contents are dispensed during operation of the machine. A discharge hose 28 from the metering device or means 26 empties into a dispensing tube 30 fixed to the knife or shank 20 to extend downwardly therebehind. Near the bottom of the shank 20, the dispensing tube 30 curves or bends through a sufficient angle to present a rearward facing outlet 32 at the end of the dispensing tube 30 below the metering device hose 28. At a rear of the frame 12, wheels 34 are rotatably mounted on the frame at an axle positioned therebelow and extending across the frame over the portion of the torpedo tube that trails behind the shank. The wheels support the frame, and include a packing wheel whose area of contact with the ground through the lowermost portion of its motion overlies the torpedo tube 22 in the lateral or transverse direction of the vehicle.

One difference between the illustrated machine and conventional burrow builders is that it includes a leveler mechanism 35 trailing a drag 35a behind the frame 12 at a distance rearward from the wheels 34. One or more towing arms 35b each has a leading end thereof coupled to the rear end of the frame by a pivot pin extending horizontally transverse to the frame to allow upward and downward pivoting of the arm relative to the frame. The trailing end of the arm 35b is coupled to the drag 35a in the same pivotal manner to allow relative pivoting between the arm 35b and the drag 35a about a horizontal axis. The drag presents one or more flat bottom surfaces lying in a common plane of the drag, for example as may be defined by two or more cross-members 35c spaced apart and joined by a longitudinal member 35d extending between them above these bottom surfaces. As demonstrated by FIG. 1, when the machine is driven over the ground, the heavy drag 35a follows along the ground surface under the pivotal freedom between the machine, tow arm and drag, and when burrow mounds 44 are encountered, the weight of the drag 35a resists riding thereof up over the dirt mound 44, instead keeping the drag 35a on level with the surrounding generally flat ground. Thus, the front face of the drag 35a spanning across the machine plows through the dirt mound 44, spreading the piled direct across and in front of the drag, eradicating the mound from the ground surface. This levels the field for further agricultural operations such as harvesting, and allows for easy later re-assessment of any new mounds, which would suggest that the further fumigation treatment of the area with the machine is required, as the creation of new mounds reflects that the previous operation of the machine either didn't successfully exterminate all the rodents, or that new rodents have invaded the area. Although not shown, one or more hydraulic actuators may be included to raise and the lower the leveler assembly 35 into and out of a raised transport position in which the tow arm is elevated to carry the drag in a suspended position raised from the ground, for example for transport of the machine or use thereof without leveling functionality.

In operation, pulled behind a towing vehicle, the machine 10 functions in the same manner as when used in the prior art to dispense a poison bait product. The coulter disc 16 extends a short distance into the ground to cut surface trash and shallow roots ahead of the shank 20. The shank 20 extends into the ground behind the disc 16 to carry the torpedo tube 22 fixed at its bottom end along in the forward working direction at a distance below the ground surface. The cylindrically round body of the torpedo behind its pointed front end forms a round tunnel in the soil at the bottom of a narrow slit cut into the soil from the ground surface by the shank 20. The metering device means 26, the dispensing rate of which may be controlled by the rotational speed of the packing wheels in a known manner or by other suitable independent means, releases toxic fumigant product such as solid fumigant tablets or pellets 36 from the hopper 24 one at a time to individually fall down the dispensing passage collectively defined by the interconnected hose 28 and dispensing tube 30. This individual release of tablets or pellets at spaced intervals means they discharge one at a time from the outlet 32 of the dispensing tube 30 so as to come to rest at spaced apart positions along the tunnel's interior. At the ground surface, the packing wheels 34 close the opening of the slit formed in the ground by the shank 20 to seal off the subterranean tunnel 38. Within the sealed tunnel 38, the solid fumigant tablets or pellets 36 are exposed to moisture in the soil or the tunnel air, and accordingly begin to release fumigant gas within the tunnel.

Figure 2:
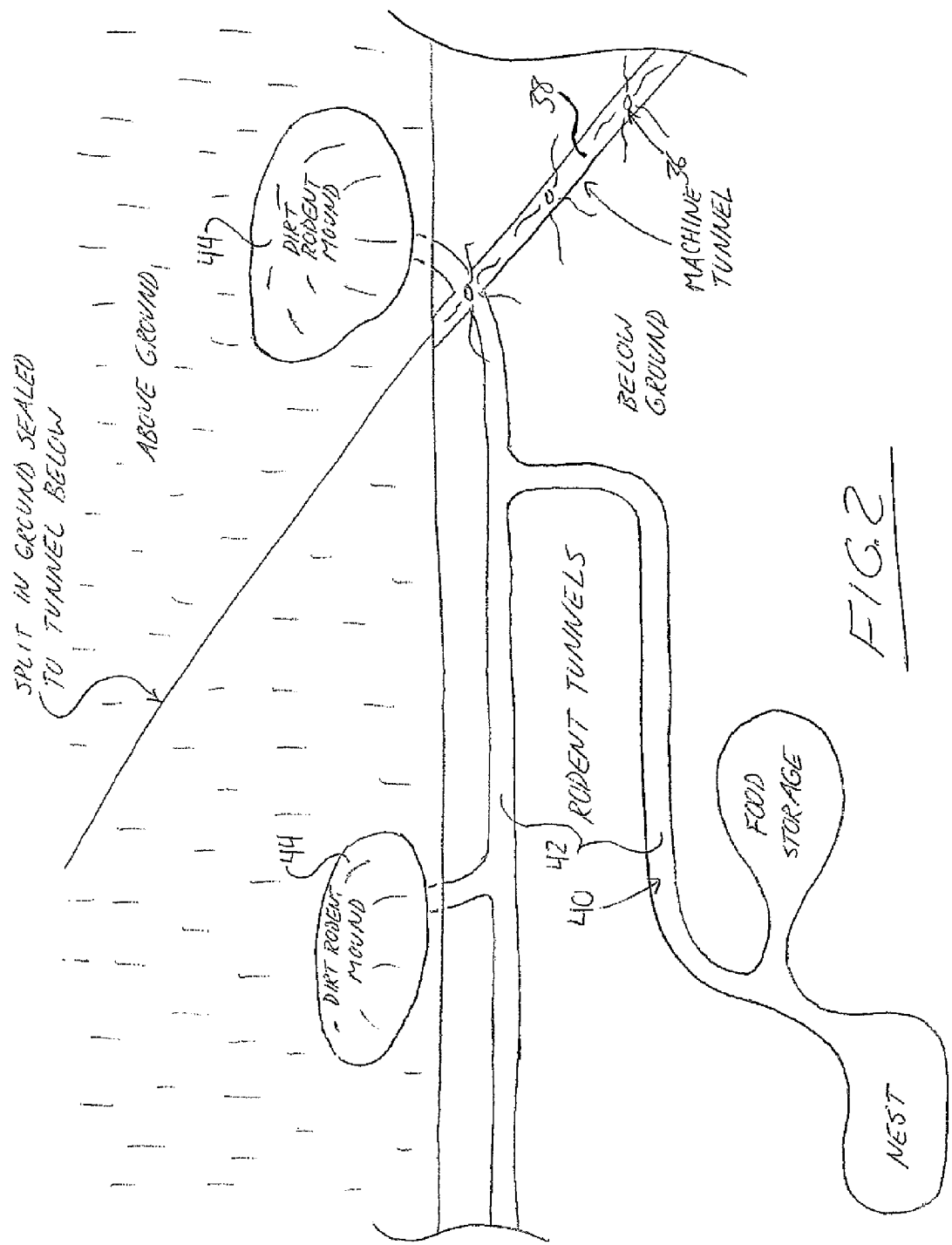
FIG. 2 is a schematic illustration of a field being treated using the machine of FIG. 1.
Figure 3:
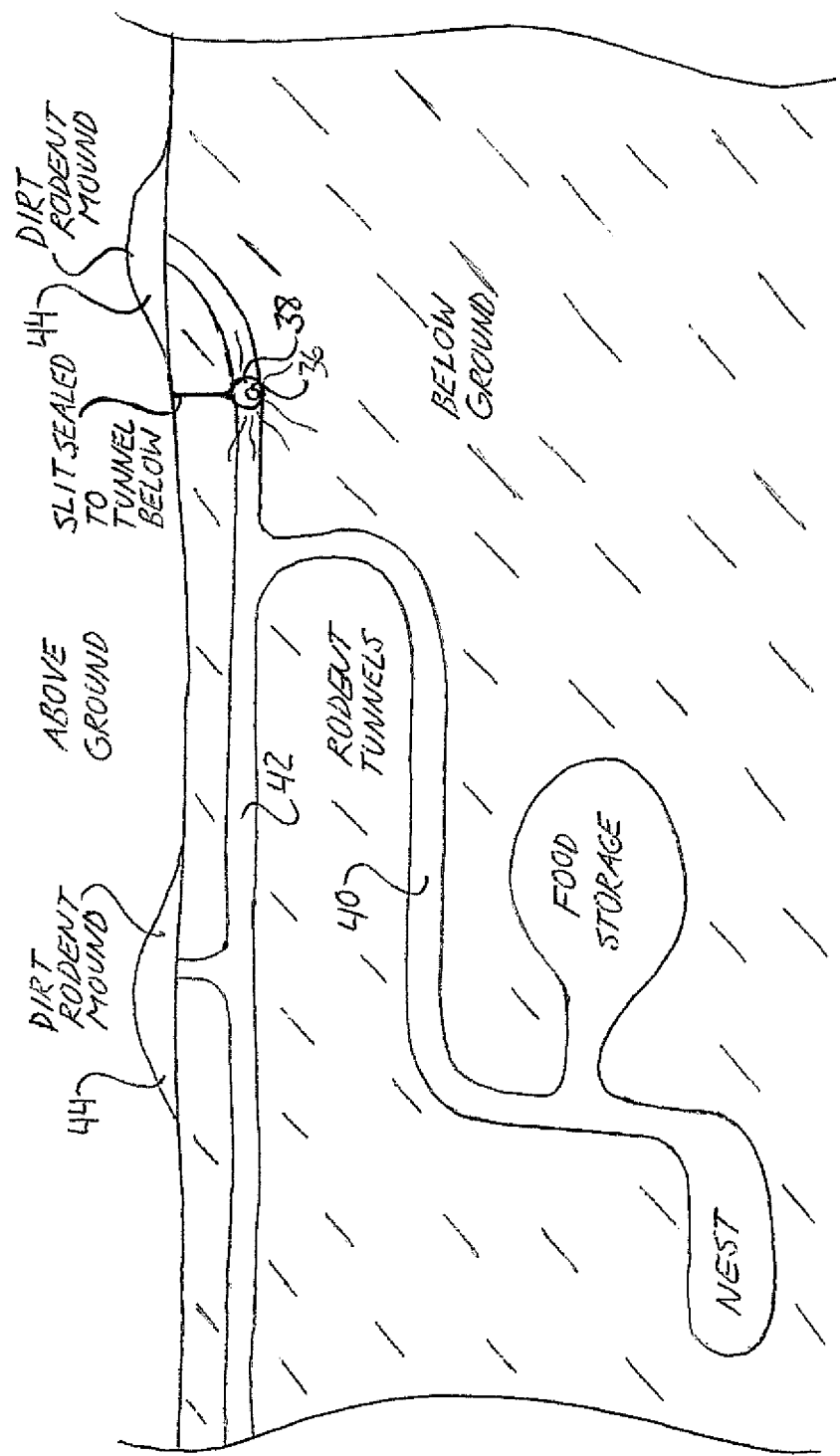
FIG. 3 is a schematic cross-sectional view of the field of FIG. 2.

The machine of FIG. 1 is used to make passes in a field like that of FIG. 2, where a rodent burrow system 40 featuring interconnected tunnel sections 42 lying beneath the surface of the field. In a known manner, the presence of some burrow systems can be recognized by the presence of dirt mounds 44 at spaced locations over the field area and featuring soil plugs where an opening to the underground burrows was once present before re-closing by the rodents. In the alternative, open burrows with soil thrown out will occur. Making a pass in each area of known recent rodent activity results in tunnels which are created by the machine to simulate rodent burrow tunnels, and at least some of which will cross through, near or adjacent tunnel sections of the rodents' actual burrow system. Where a machine-made tunnel 38 crosses through a burrow tunnel, as shown in FIGS. 2 and 3, fumigant gas, from the toxic product 36, has the opportunity to spread from the artificial machine-made tunnel into the natural burrow tunnel and rodents are likewise free to venture into the artificial tunnel. Depending on the permeability of the soil, even where an artificial tunnel passes by a natural burrow tunnel in close proximity thereto without the two actually intersecting, fumigant gas may reach the natural tunnel. This field treatment provides a significant likelihood that any rodents in the burrow system will at some point access a natural or artificial tunnel section that has been gassed within the time frame that the fumigant gas is present.

The man hours saved by conveying a ground engaging dispenser over an affected area compared to prior art solid-fumigant methods requiring burrow tunnel location and direct and manual solid-fumigant insertion thereto on a sufficient level to ensure that a significant enough percentage of the burrow is exposed to the fumigant gas is significant. Fewer man hours reduces the cost of labor associated with hiring someone for the task, and the fact that the job primarily requires only the driving of a towing vehicle or self-propelled machine eases the physical effort level and thus increases the pool from which suitable fumigator personnel can be selected. Lower costs make this rodent solution suitable even for low value crops.

This method also significantly reduced the exposure time of any individual involved in dispensing of the solid fumigant product, thereby providing a health and safety benefit. The machine operator can open the product container once, transfer the contents thereof to the hopper and then avoid any exposure to the fumigant product for the rest of the dispensing process. Beyond modification of conventional burrow builder design to replace a granular product metering device with a metering device capable of handling larger solid fumigant tablets or pellets and corresponding increase in size of the product dispensing tube, the machine may incorporate a tippable hopper design in which the hopper can be pivoted to at least partially overturn so that remaining product after a field application can be easily poured out of the temporarily downward facing open wide end of the hopper back into the original product container or suitable storage container for safe storage in a suitable location, without requiring the operator to manually dig tablets or pellets out of the hopper, thereby further minimizing contact and time exposure to the product. Making the fumigation process safer again increases the number of people willing to take on the job, and may reduce cost if willing operators charge less than they would for higher-risk employment.

Additional machine features are also contemplated to assist in utilizing the invention. For example, using phosphine-releasing aluminum phosphide tablets as an exemplary solid-fumigant product, although the phosphine gas will later be released as soil and air moisture increases with changing meteorological/environmental conditions even if the burrow soil and air is initially too dry to activate the fumigant when initially deposited by the machine, the machine may be further equipped with a frame-carried liquid reservoir 46 (FIG. 1) to be filled with water by the operator before deployment for operation so that the operator can selectively choose whether to also dispense small volumes of water into the machine created ratification tunnels with the fumigant tablets to ensure their prompt activation by increasing the moisture content in the tunnels. This way, if the soil is too dry to cause the phosphine release at the placement time of the tablets, the operator need not leave the activation of the fumigant to the probability of precipitation or somehow provide the required moisture through a process separate from the machine's operation to dispense the tablets.

In the embodiment of FIG. 1, the machine is distinguished from conventional burrow builders by such an arrangement, in which a water line or hose 48 runs from the tank 46 and is secured in place in a suspended position extending downward from the frame 12 between the shank 20 and the product delivery tube 30 and into the torpedo tube 22, where the water line 48 then runs to the rear end of the torpedo tube. A discharge end 48*a* of the water line 48 delivers water into the machine formed tunnel 38 at the trailing end of the torpedo tube 22, similar to the fumigant product delivery from the outlet 32 of the product delivery tube 30 at this open rear end of the torpedo tube. The water delivery may be gravity fed, or otherwise powered or pressurized, and may continuous, or may be timed or controlled much like the metering device to only intermittently distribute water into the tunnel 38 according to the timing of the fumigant product delivery thereto, for example through use of a valve configuration arranged to intermittently open based on wheel rotation or other input linked to the timing of the conveyance of fumigant product units through the product delivery tube 30.

As another feature, the machine may incorporate a pneumatic distribution system like that of an agricultural air seeder as opposed to relying solely on a gravity feed of fumigant product from the hopper to the outlet of the dispensing tube, to reduce the likelihood of plugging.

It is further possible that if soil permeability is sufficient, the method of the present invention may be carried out without having to necessarily form an artificial tunnel beneath the ground surface, since if the released fumigant gas can enter a natural burrow tunnel by permeating thereinto from a nearby toxic source, then it may not be so important that the toxic product is deposited in an open tunnel-like space. Accordingly, it may be possible to use a machine lacking a burrow forming element like the torpedo tube, and instead just featuring a knife opener to cut a furrow into the soil for placement of the tablet therein through the dispensing tube, and again use a closing mechanism like the packing wheels of the illustrated embodiment to then re-close the ground above the deposited tablet. Such an implement could therefore be similar to that used for seeding or fertilizing operations, but again with appropriately scaled metering equipment and dispensing tube to accommodate the toxic product, and therefore an opener suitably sized to protect the dispensing passage behind its front cutting edge. Also, the implement would preferably have fewer ground engaging shanks than seeding equipment, which multiple shanks situated across the frame in order to establish adjacent seed rows. The illustrated embodiment has only a single shank to minimize disturbance to the land, and minimize crop damage when plants are present.

Figure 4:
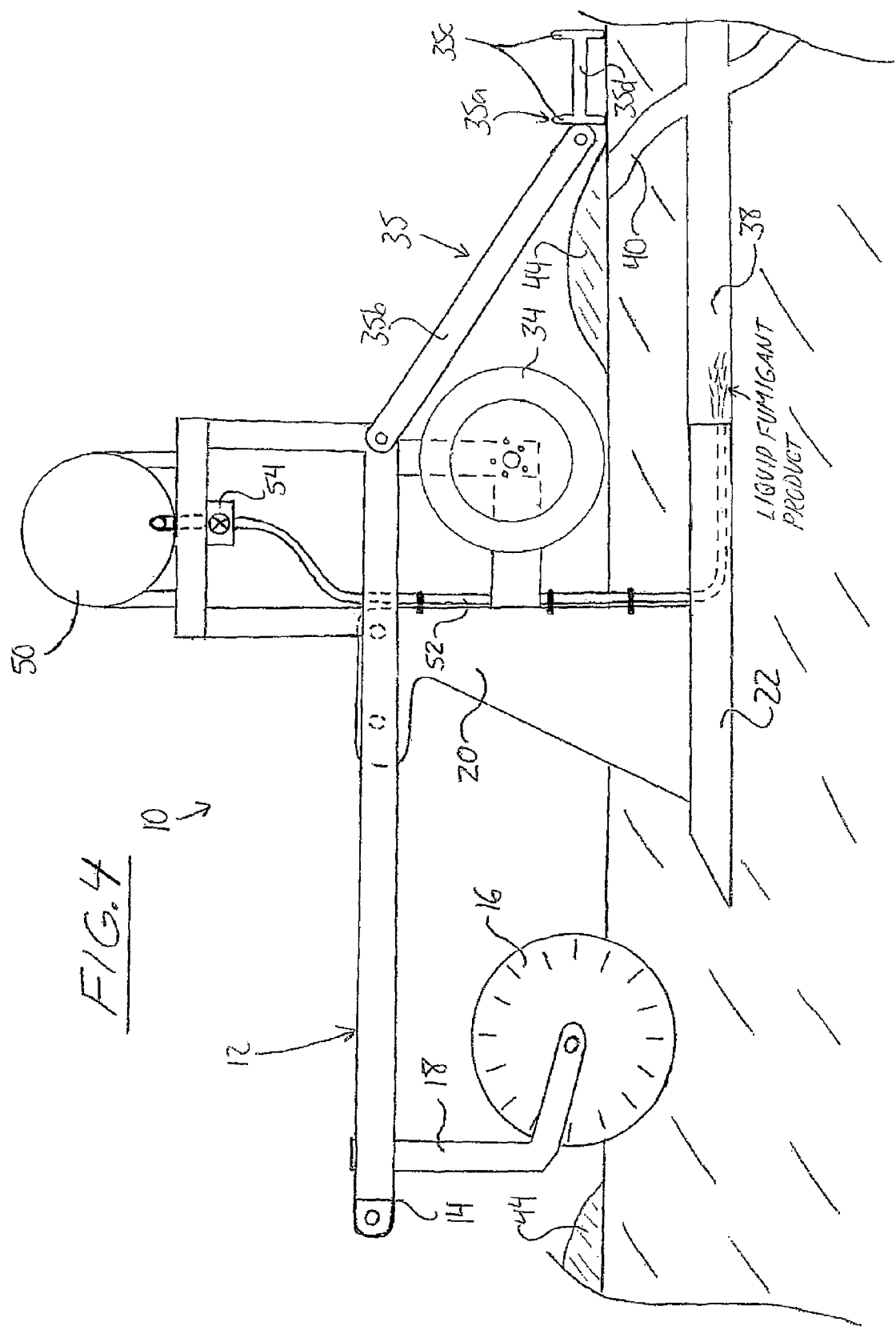
FIG. 4 is a schematic side elevational view of a second embodiment burrow building machine configured to dispense a liquid fumigant product into the simulated burrow tunnel formed by the machine.

Another embodiment of the present invention, shown in FIG. 4, may employ a liquid or liquefied fumigant product injected into the ground by the towed or driven apparatus. The apparatus would be operated in a similar manner to the granular fumigant apparatus described above, i.e. driven across an area to be treated while dispensing the product into the ground at a depth corresponding to the burrow tunnel depth of the rodent during the passes over the area such that product dispensed. The apparatus may be similar in overall structure to the granular fumigant embodiment, for example substituting a liquid storage tank 50 for the granular hopper to form the fumigant product container, and having a tube, hose or other suitable conduit 52 running down the back of the shank 20 to a nozzle or outlet near the rear end of the torpedo tube 22. The liquid may be gravity or pump fed, or the fumigant tank may be pressurized to drive the dispensing process. Much like described above for the liquid tank 46 of FIG. 1, suitable valving 54 may be used and controlled or timed to open and close in an intermittent matter tied to the conveyance of the vehicle over the ground so as to effectively meter a select amount of the liquid fumigant to delivered at spaced apart locations within the machine formed tunnel 38. Prior art apparatuses for shank injection of liquid fumigants are known for control of weeds, soil-borne pathogens, nematodes (roundworms), symphylans (garden centipedes) and wireworms. However, employing a torpedo tube like that of the illustrated apparatus to form an artificially created tunnel into which the liquid fumigant is delivered behind the torpedo tube to freely give off fumigant gas into the air space of the tunnel, from which it can drift into the rodent created tunnels, is believed to be unique to the present invention.

Several important, although not necessarily essential, features of the invention may be summarized as follows:
1) The use of toxic products that give off gas instead of acting as bait.
2) The toxic gas product is machine applied, not manually placed.
3) The toxic gas is released over a length of time, and not entirely given off in a single momentary instant.
4) The toxic gas is not tied up by soil or water as occurs with anhydrous ammonia ($NH_3$), which gets tied up in the soil by exposure to the water/moisture therein.
5) The machine is preferably used only locally in particular parts of a field or area of land where burrow mounts are visible, as opposed to prior art burrow-builder techniques where passes are made over the entire field. This way, gas is only dispensed in the vicinity of rodent burrows, i.e. is not randomly applied. This reduces any crop damage, fumigant cost, and environmental impact.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A method of pest control for burrowing rodents that maintain a burrow system, the method comprising:
providing a dispensing apparatus conveyable in a forward working direction and comprising a frame, a ground engagement tool carried on the frame and extending downward therefrom, a container carried with the frame, a metering device associated with an outlet of the con- tainer, and a product delivery passage communicable with the container through the metering device and extending downward behind a leading portion of the ground engagement tool to a dispensing outlet behind the ground engagement tool;

loading the container of the dispensing apparatus with a fumigant product;

making one or more passes across an area of ground beneath which the burrow system is situated with the ground engagement tool of the dispensing apparatus engaged in the ground to pass through or by sections of the burrow system; and during the one or more passes, dispensing fumigant product into the ground behind the leading portion of the ground engagement tool; and leaving the fumigant product in the ground to gradually release fumigant gas over time.

2. The method of claim 1 wherein the fumigant product is a phosphine releasing product.

3. The method of claim 1 wherein the fumigant product comprises aluminum phosphide.

4. The method of claim 1 wherein the fumigant product comprises magnesium phosphide.

5. The method of claim 1 wherein the fumigant product is moisture activated.

6. The method of claim 1 wherein the fumigant product comprises solid fumigant pellets.

7. The method of claim 1 wherein the fumigant product comprises solid fumigant tablets.

8. The method of claim 1 wherein the fumigant product is a solid fumigant product, units of which are dispensed one at a time at spaced apart intervals to place individual units at spaced apart positions in the ground.

9. The method of claim 1 wherein the burrow system is a closed burrow system.

10. The method of claim 1 wherein the burrowing animals are pocket gophers.

11. The method of claim 1 wherein a food source for the burrowing animals is present in the ground.

12. The method of claim 1 wherein the ground contains plant roots.

13. The method of claim 1 wherein the ground contains alfalfa roots.

14. The method of claim 1 wherein the dispensing apparatus comprises a burrow builder and the ground engagement tool comprises a burrow forming element engaged in the ground to form sections of underground tunnel that intersect with the sections of the burrow system.

15. The method of claim 5 comprising dispensing liquid into the ground to activate the fumigant product.

16. The method of claim 15 wherein the liquid is dispensed from a liquid source connected to the dispensing apparatus.

17. The method of claim 16 wherein the liquid source is carried on the frame of the dispensing apparatus.

18. The method of claim 1 wherein the fumigant product is in a liquid state.

19. The method of claim 1 wherein the fumigant product is in a flowable state and is placed in the soil to slowly release toxic gas.

20. A method of pest control for burrowing rodents that maintain a burrow system, the method comprising:

providing a dispensing apparatus conveyable in a forward working direction and comprising a frame, a burrow forming element carried on the frame and extending downward therefrom, a container carried with the frame, a metering device associated with an outlet of the container, and a product delivery passage communicable with the container through the metering device and extending downward behind a leading portion of the burrow forming element to a dispensing outlet behind the burrow forming element;

loading the container of the dispensing apparatus with a fumigant product;

making one or more passes across an area of ground beneath which the burrow system is situated with the burrow forming element tool of the dispensing apparatus engaged in the ground to form sections of underground tunnel that pass through or by sections of the burrow system; and during the one or more passes, dispensing fumigant product into the underground tunnel behind burrow forming element.

* * * * *